UNITED STATES PATENT OFFICE.

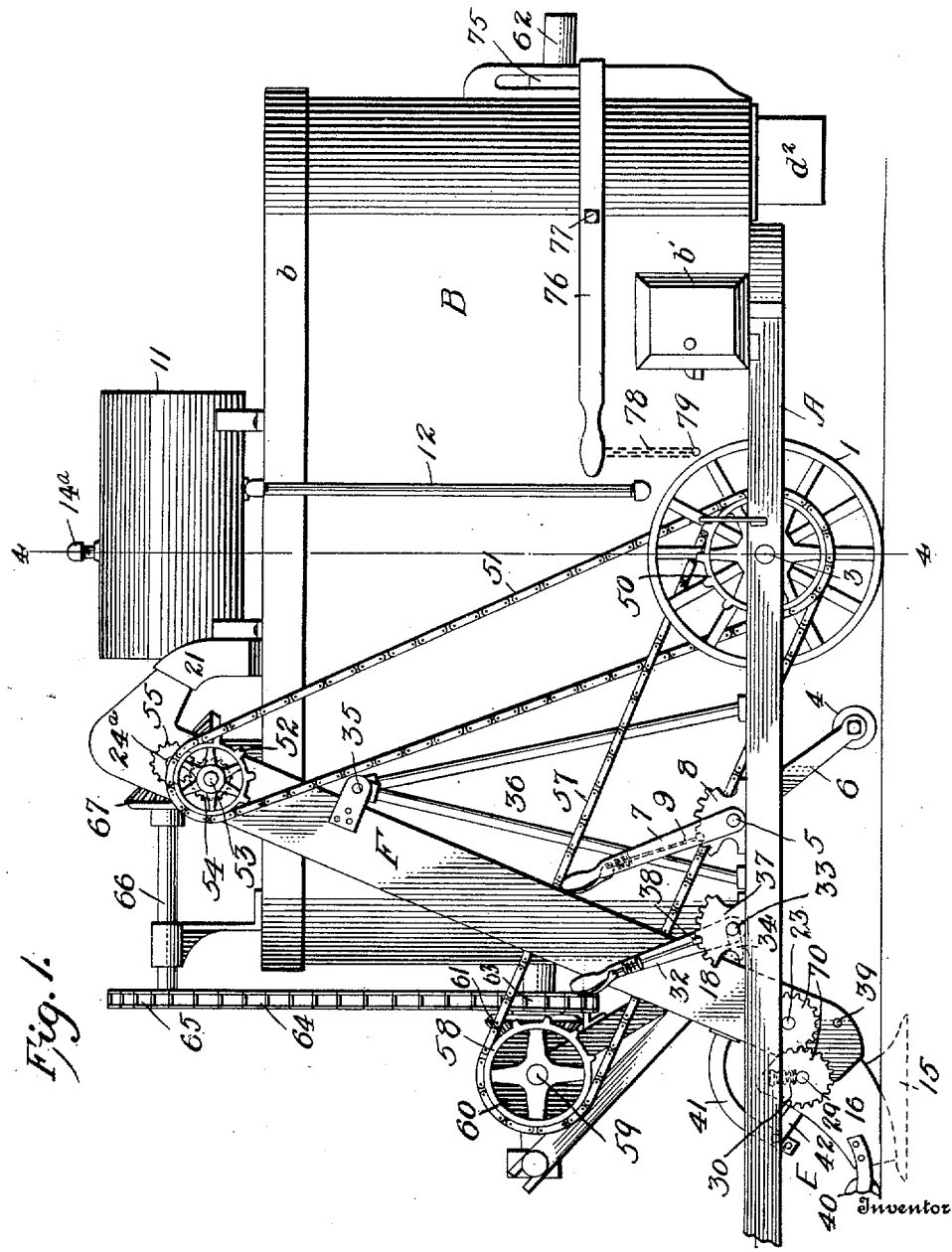

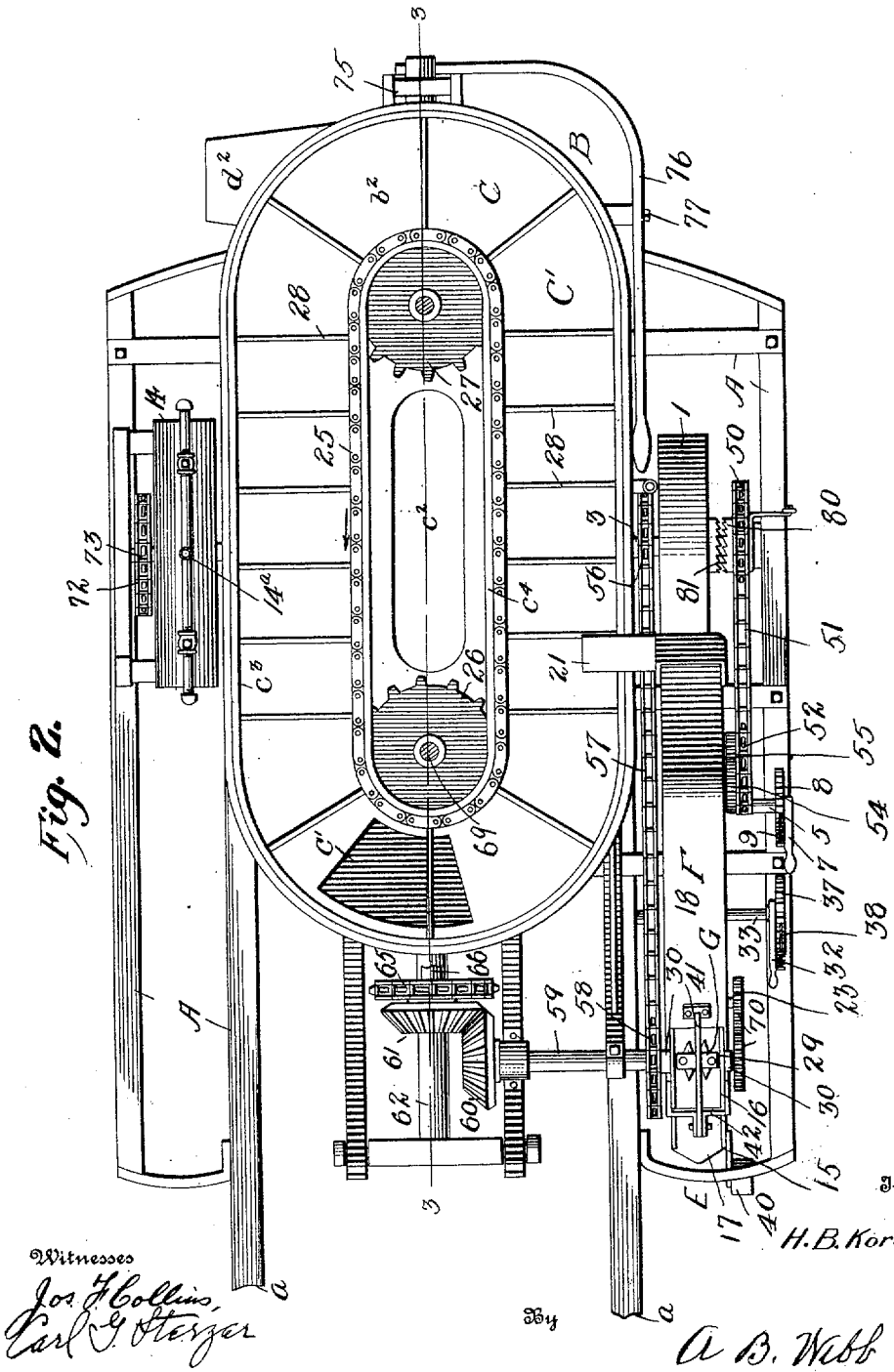

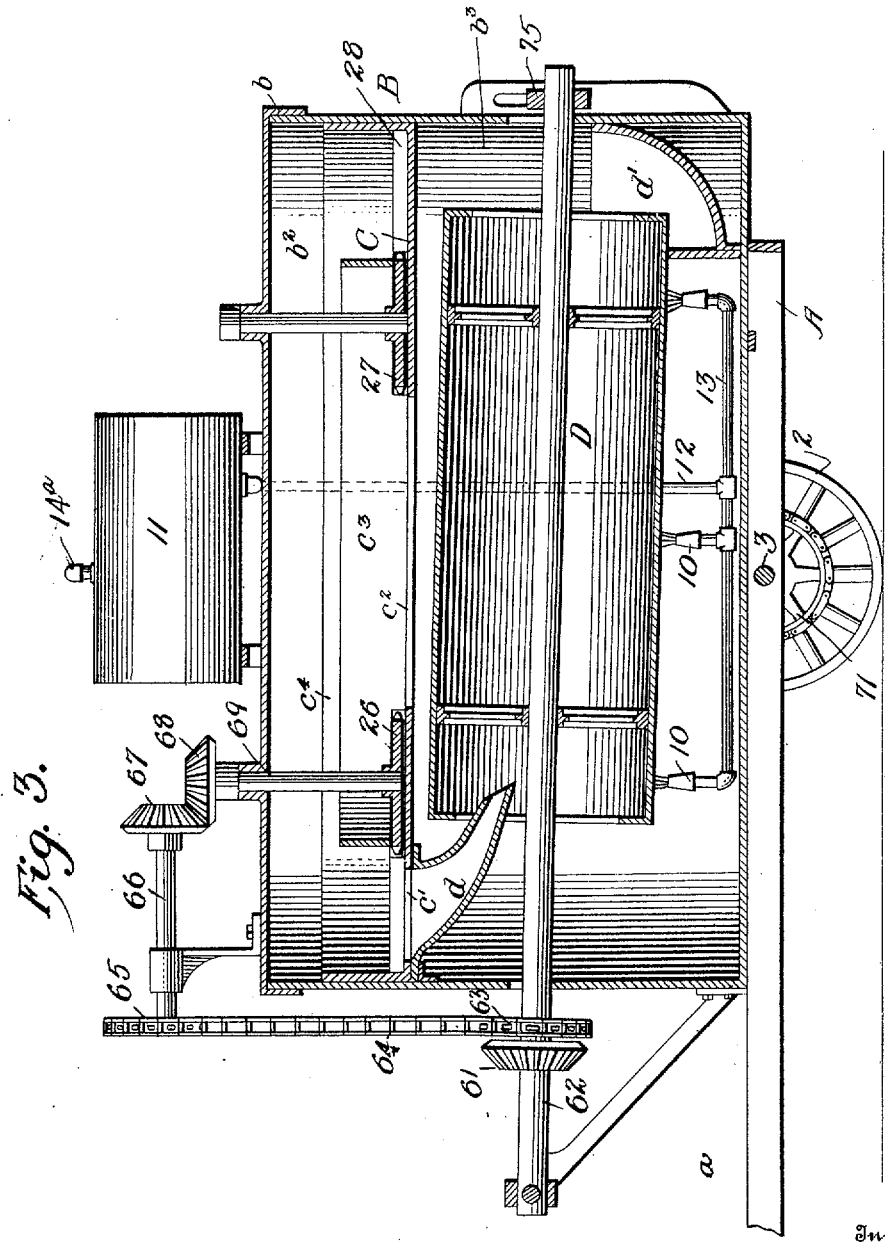

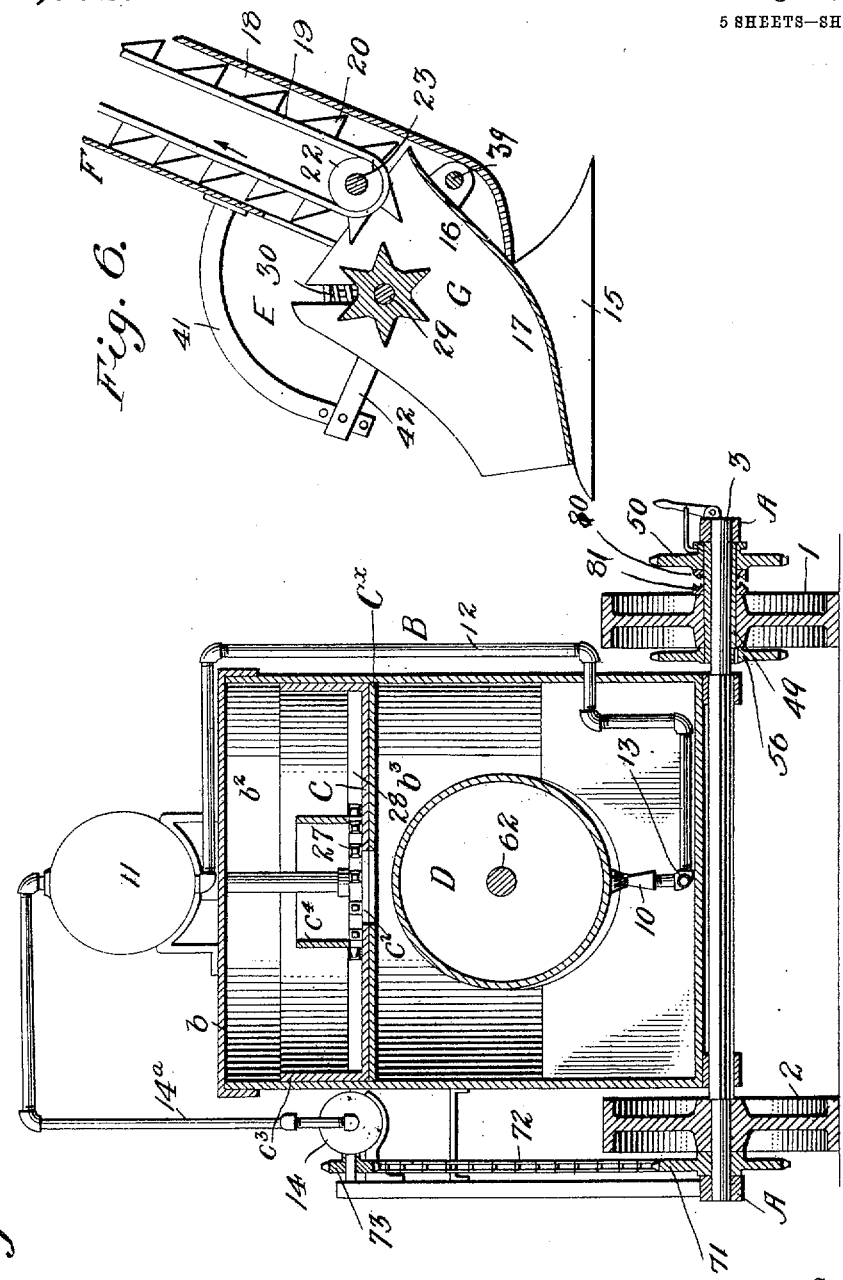

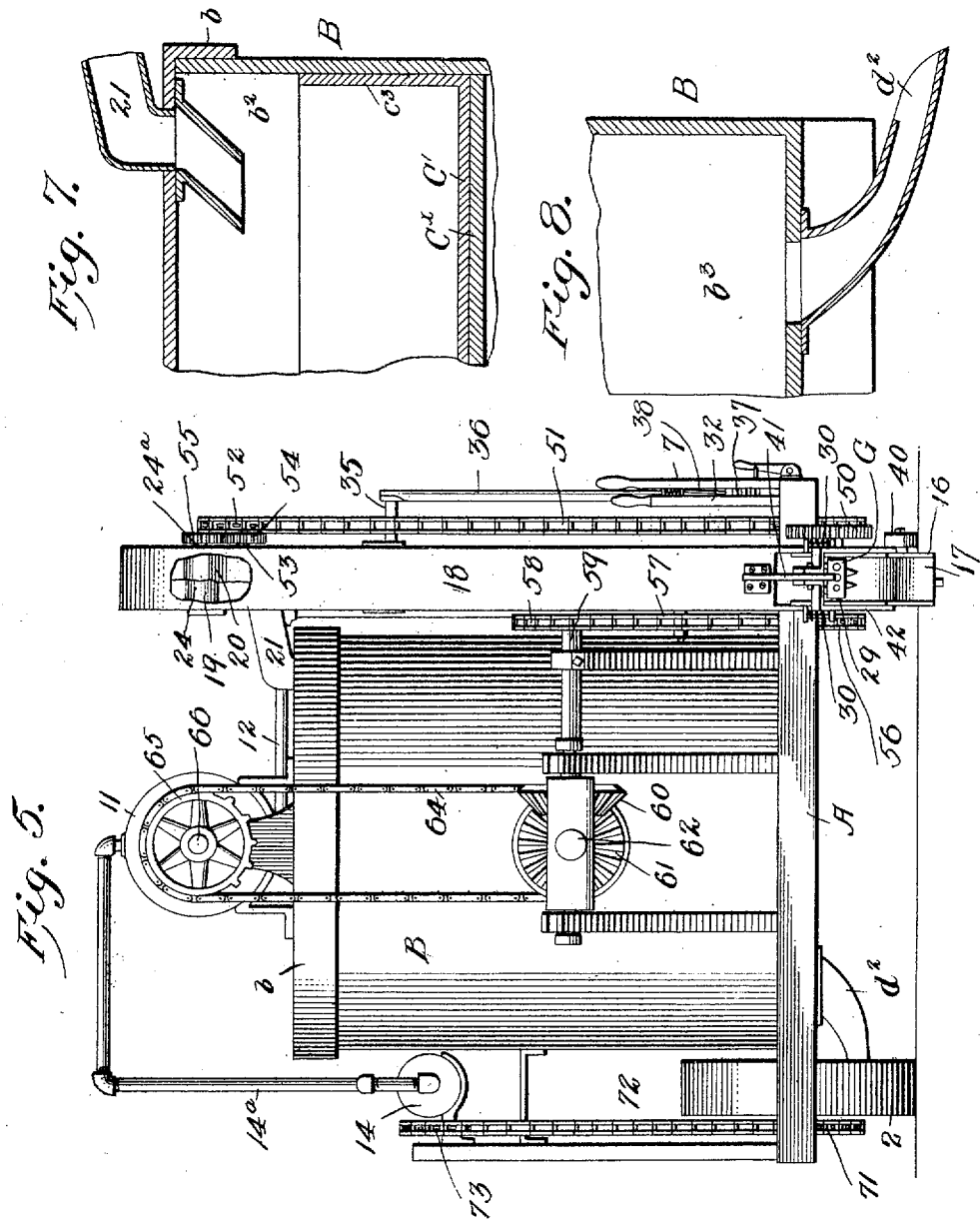

HENRY B. KORESSEL, OF HOWELL, INDIANA.

WEED AND GRASS DESTROYER.

968,772.  Specification of Letters Patent.  Patented Aug. 30, 1910.

Application filed January 15, 1909. Serial No. 472,542.

*To all whom it may concern:*

Be it known that I, HENRY B. KORESSEL, citizen of the United States, residing at Howell, in the county of Vanderburg and State of Indiana, have invented certain new and useful Improvements in Weed and Grass Destroyers, of which the following is a specification.

This invention has for its main purpose the provision of a machine which while being moved across a grass field or other plot of ground will automatically remove the top or surface thereof, kill the grass and weeds therein and return the soil to the ground. In pursuance of this object I have provided a machine or apparatus adapted to be moved across the surface of the ground to be treated and embodying instrumentalities whereby the soil or top surface is removed for a predetermined depth, thence conveyed to a portion of the machine or apparatus where the roots therein are killed and, in its passage thereto is subjected to the action of a device by which the soil is opened up whereby the killing agent may effectively reach all parts thereof, and is finally returned to the ground with the vegetal matter therein in condition to enrich the soil.

The invention consists in certain novel combinations of parts, and in peculiarities in the construction and arrangement of elements, substantially as hereinafter described and particularly pointed out in the claims.

In the accompanying drawings I have shown an apparatus or machine which illustrates the features of the present invention in what I now regard as the best forms thereof, but it is to be understood that the illustrated forms of the invention are merely exemplary and that the invention is not restricted to the details illustrated and may be widely varied and embodied in many different forms of mechanism without departing from the spirit of the invention and the scope of the subjoined claims.

In said drawings:—Figure 1 is a side elevation of a machine embodying my improvements. Fig. 2 is a plan view of the same, with the cover removed. Fig. 3 is a longitudinal vertical section taken on a line corresponding to the line 3—3 in Fig. 2, but including the cover of the machine. Fig. 4 is a transverse vertical section on the line 4—4 of Fig. 1. Fig. 5 is a front end view. Fig. 6 is a detail view of the means for removing the soil and loosening its particles, and of a portion of the means for elevating it to the root-killing element of the machine. Fig. 7 is a detail view showing the outlet from the elevator to the casing. Fig. 8 is a detail view showing the discharge chute for the dead roots and vegetal matter.

The same characters of reference designate the same parts in the several views.

In the exemplified form of my invention the frame A, which may be of any suitable construction, is of sulky form, that is to say, it is carried by two wheels 1 and 2 mounted upon the ends of a cross-axle 3, upon which the frame is balanced. This form is believed to be best adapted to serve the purposes of the present invention, though other forms may be employed if desired. When this sulky-form is employed, an additional supporting means from the ground may be employed to tilt the machine while going up or down a hill. This additional supporting means may be one or more suitably arranged small wheels 4 suspended from a shaft 5 by an arm or arms 6 and adjusted to and from the ground by a lever 7 and held in adjusted position by any suitable means, as a rack 8 on the frame A and a suitable detent 9 on the lever.

The illustrated form of the machine is intended to be drawn by an animal, the shafts for which are shown broken off at $a$, but it is apparent that it may be otherwise propelled if desired. Carried by this frame A is a casing B, provided with a cover $b$ and a door $b'$ for giving access to its interior. This casing is shown as divided by a plate C into two chambers $b^2$ and $b^3$, the former of which receives the dirt and weeds, and the latter of which chambers ($b^3$) contains a rotatable drum D within which the roots are killed. The plate C is provided with an outlet opening $c'$ which communicates with the receiving end of the drum through a spout $d$ and the discharging end of said drum opens into a discharge chute $d'$ which is located at the rear end of the casing and is provided with a spout $d^2$ arranged to direct the dirt and vegetal matter to the ground. The plate C is also provided with a longitudinal opening $c^2$ through which the chamber $b^2$ has communication with the chamber $b^3$ and it is provided with parallel or concentric walls $c^3$ and $c^4$ forming with the bottom of the plate a trough or way C' for the material. A second plate (C<sup>x</sup>) having openings registering with the openings in the plate C may be mounted on the latter if desired.

The roots of any weeds, grass or other plants contained in the soil are killed in their passage through the drum D. The means illustrated for this purpose subject the roots to a heat of a sufficient intensity to accomplish the purpose suggested, imparted thereto partly through the wall of the drum and partly by direct contact therewith, the ends of the drum being open to the chamber $b^3$. The preferred means comprises a series of gasolene or other suitable burners 10 disposed at suitable distances apart along the length of the drum and supplied with fuel from a tank 11 connected therewith by pipes 12 and 13. A pump for forcing air into the tank 11 is illustrated at 14. This pump may be operated in any suitable way, and is connected with the tank by a pipe $14^a$.

It will be noted that the flames from the burners 10 are directed against the wall of the drum and serve also to heat the chamber $b^3$ and the plate C forming the top wall thereof and that the heated air flows through the opening $c^2$ in said plate C, into the chamber $b^2$. The material in the chamber $b^2$ is thus heated directly by hot air flowing into contact therewith and by heat radiated from the plate C.

At the front of the machine there is arranged a soil cutter E and an elevator F, which coöperate to deliver the soil to be treated to way $C'$ in the chamber $b^2$ of the casing: and within said way there is a traveling means which moves the soil along the heated plate C, from the place of its discharge from the elevator to the opening $c'$. The soil cutter comprises a plow 15, or other suitable sod or soil remover, carried by a frame 16 which is open at the front and rear, and is closed at the bottom by an upwardly inclined wall 17. This frame forms the mouth of or inlet to an upwardly inclined chute 18 within which is arranged an endless traveling belt 19 having pushers or buckets 20 which convey the soil upward along the bottom of the chute and to the spout 21 by which the soil is delivered to the way $C'$. The belt 19 may be of chain or plane form. It is shown as the latter and as running over a pulley wheel 22 mounted on a shaft 23 at the bottom of the chute. It also runs over a driving pulley 24 at the top of the chute. (See Fig. 5.) The traveling means, already referred to, similarly consists of an endless traveler, shown as a chain 25 running over sprockets 26 and 27, provided with arms or fingers 28 by which the soil is moved, around and upon the plate, to the discharge opening $c'$.

At a suitable place in advance of the traveling elevating means a disintegrator G is arranged. This disintegrator is here shown as a pulverizing roller, which may be of any suitable construction. This roller is preferably mounted on a shaft 29, which is subjected to the pressure of springs 30 to enable the roller to yield to inequalities in the amount of material delivered to it and at the same time cause it properly to be held to its work.

Suitable means are employed to adjust the depth of penetration of the plow and to raise it out of the ground when necessary. As herein shown, this consists of a lever 32 mounted on a shaft 33 having a crank arm 34 which is suitably secured to the chute 18, and the latter is pivotally mounted at 35 upon a support 36 carried by the frame A. It will be seen that the raising or lowering of the crank arm by rearward or forward movement of the lever 32 will correspondingly raise and lower the lower end of the chute 18 and the plow. To hold the parts in adjusted position any suitable detent mechanism may be employed, for example, the illustrated rack 37 and spring-pressed gripper-actuated dog 38.

The plow frame 16 is preferably pivotally mounted at 39 upon the lower end of the chute 18 and is provided with a supporting roller 40 whereby it may follow inequalities in the surface of the ground. It is also preferably supported by an arm 41 connected therewith by a link 42.

It will now be seen that as the machine is moved along the surface of the ground the sod or soil is removed therefrom and passes upwardly within the frame 16 and is disintegrated by the roller 29 and is then caught by the elevator buckets or fingers 20 and raised thereby to the spout 21 by which it is delivered to the way $C'$. It falls upon the heated plate C and is engaged and pushed along said plate in the direction of the arrow to the opening $c'$. It is thus in its loosened and disintegrated condition maintained in contact with the heated plate a sufficient length of time to receive a measurable degree of benefit therefrom, particularly being deprived of a part or all of the moisture contained therein. It is thence delivered by the spout $d$ to the receiving end of the heated drum D. This drum is inclined rearwardly and is rotated, whereby the material is caused to travel toward the rear end thereof and in its travel is agitated by moving upward with the wall of the drum and thence falling to the bottom. In this way and by this means access to vegetal matter in the material is assured, all parts of the material are heated alike and the material remains in the drum a sufficient length of time to be effectually treated by the heat, which is of an intensity sufficient to kill all the vegetal matter therein. From the rear end of the drum D the material falls into the discharge chute $d'$ and thence leaves the machine and is delivered to the ground through the spout $d^2$.

Any suitable means for rotating the several moving parts hereinbefore set forth may be employed without departing from the spirit of the invention. I have here shown suitable gear connections deriving motion from the driving and supporting wheel 1, as follows:—

49 designates a sleeve which is loosely mounted on the axle 3.

50 designates a sprocket which is mounted upon this sleeve and receives motion from the wheel 1. This sprocket is connected by a chain 51 with a sprocket 52 mounted on a shaft 53 provided with a gear 54 which meshes with a gear 55 mounted on the shaft 24ᵃ which carries the before mentioned driving pulley 24 of the elevator belt 19. By this means the elevator is driven. A second sprocket, 56, is mounted on the sleeve 49 and receives motion therefrom. This sprocket is connected by a chain 57 with a sprocket 58 mounted on a shaft 59 extending across the front of the machine. This shaft is provided with a bevel gear 60 which is intermeshed with a similar gear 61 mounted on a shaft 62 which extends longitudinally of the machine, through the casing B. The drum D is mounted upon this shaft and is driven thereby. The shaft 62 is also provided with a sprocket 63 which is connected by a chain 64 with a sprocket 65 mounted on a shaft 66 provided with a bevel gear 67. This gear 67 meshes with a similar gear 68 which is mounted upon a shaft 69 extending vertically into the casing. This shaft 69 carries the sprocket 26 which drives the chain 25, and said chain thus derives motion from the sleeve through the instrumentalities described. The pulverizer G derives its motion from the shaft 23 of the driving pulley 22 of the elevator, being connected therewith by suitable gears 70.

The pump 14 is shown as driven by a sprocket 71 connected by a chain 72 with a sprocket 73 mounted on a shaft of the pump. This sprocket is preferably driven from the driving wheel 2, though it may be driven from the axle or any other suitable part of the machine. Suitable provision is made for regulating the supply of air from the pump to the tank 11 to regulate the pressure on the gasolene.

Provision for adjusting the inclination of the drum D in order to regulate the speed of the flow of the material therethrough is preferably made. For this purpose I prefer to mount the rear end of the shaft 62 in a vertically adjustable bearing 75 provided with an adjusting lever 76, fulcrumed at 77 upon the outside of the casing and provided with means for holding it in adjusted position, such as the chain 78 and holding pin or projection 79. Suitable provision also is made for disconnecting the driving connections when, as in moving from place to place, it is not intended to communicate movement to the several actuating parts. To this end the sleeve 49 which carries the sprockets 50 and 56 preferably derives its motion from the former sprocket and communicates motion to the sprocket 56, and the sprocket 50 is slidably mounted on the sleeve and is provided with one member 80 of a clutch, the other member 81 of which is fixed to the supporting and driving wheel 1 of the machine. The sprocket is moved by a clutch-actuating lever suitably connected thereto, as shown best in Fig. 4.

In practice, the gear connections to the air pump 14 will also include a clutch or other suitable means for disconnecting the same and this preferably will have an actuating handle extending to the opposite side of the machine where it will be accessible to an attendant stationed near the other levers.

From the foregoing description the construction, operation and advantages of my machine will be readily understood and it will be seen that my machine embodies many novel combinations of elements and that I have illustrated simple and practical forms of the elements of novel and advantageous construction, all of which constitute features of the present invention.

Having now described my invention and particularly set forth what I regard as the best form thereof, I claim:—

1. In a weed killer, a rotatable drum, means for delivering material to the interior thereof comprising a soil remover, an elevator for the soil, a plate having a discharge opening communicating with the drum, means for moving the material over the plate and to the discharge opening, and means for killing the roots in the material in the drum.

2. In a weed killer, a rotatable drum, means for delivering material to the interior thereof comprising a soil remover, an elevator for the soil, a plate having a discharge opening communicating with the drum, means for moving the material over the plate and to the discharge opening, and means for heating the drum and plate.

3. In a weed killer, a casing having a plate provided with an opening adapted to admit heated air from one portion of the casing to the other, and also provided with an outlet for material to be treated, a rotatable drum arranged in the casing and having communication with said outlet, a heating means, and means for moving the material over said plate and to the outlet.

4. In a weed killer, a casing having a plate provided with an opening adapted to admit heated air from one portion of the casing to the other, and also provided with an outlet for material to be treated, a rotatable drum arranged in the casing and having communication with said outlet, a heating means, means for moving the material over said plate and to the outlet, and means for delivering the material to said plate.

5. In a weed killer, a casing having a plate provided with an opening adapted to admit heated air from one portion of the casing to the other, and also provided with an outlet for material to be treated, a rotatable drum arranged in the casing and having communication with said outlet, a heating means, means for moving the material over said plate and to the outlet, and means for delivering the material to said plate, comprising a soil remover and an elevator.

6. In a weed killer, means for removing the surface soil, means for disintegrating the soil, a conveyer for conducting the soil from the disintegrating means, a plate to which the soil is delivered by the conveyer, said plate provided with a way having an outlet, means for moving the soil along said way and to the outlet, a rotatable drum having communication with the outlet, and means for killing the roots in the drum.

7. In a machine of the character set forth, a wheeled frame, a casing carried thereby, means in the casing for killing weeds, and mechanism for supplying the machine with material to be acted upon by the weed killing means, comprising means for cutting the material from the surface of the ground, means for disintegrating the same to expose all parts thereof to the action of the weed-killing means and means for conducting the disintegrated material to the place where it is acted upon by the weed-killing means.

8. In a machine of the character set forth, a wheeled frame, a casing carried thereby, means for killing weeds, including a rotatable drum in which the weeds are killed, said drum mounted in the casing, mechanism for supplying the drum with material to be treated therein, comprising means for cutting the material from the surface of the ground and means for conducting the material to the interior of the drum, and means for conducting the treated material to the ground.

9. In a machine of the character set forth, a wheeled frame, a casing carried thereby, means for killing weeds, including a rotatable drum in which the weeds are killed, said drum mounted in the casing, mechanism for supplying the drum with material to be treated therein, comprising means for cutting the material from the surface of the ground, means for conducting the material to the interior of the drum and a disintegrating means arranged between the cutting means and conducting means.

10. In a machine of the character set forth, a wheeled frame, a casing carried thereby, means for killing weeds, including a rotatable drum in which the weeds are killed, said drum mounted in the casing, mechanism for supplying the drum with material to be treated therein, comprising means for cutting the material from the surface of the ground, means for conducting the material to the interior of the drum and a disintegrating means arranged between the cutting means and conducting means, and means for conducting the treated material to the ground.

11. In a machine of the character set forth, a wheeled frame, a casing carried thereby, a plate in said casing providing a way for the material, having an outlet therefrom, a traveling means for moving the material along said way to the outlet, means whereby the material is treated in its movement along said way, and mechanism for supplying the way with material, comprising means for cutting the material from the surface of the ground and means for conducting the same to the way.

12. In a machine of the character set forth, a wheeled frame, a casing carried thereby, a plate in said casing providing a way for the material, having an outlet therefrom, a traveling means for moving the material along said way to the outlet, means whereby the material is treated in its movement along said way, and mechanism for supplying the way with material, comprising means for cutting the material from the surface of the ground, means for disintegrating the material and means for conducting the disintegrated material to the way.

13. In a machine of the character set forth, a wheeled frame, a casing carried thereby, a plate dividing the casing into two chambers, traveling means in one of the chambers for moving material therein, weed killing means in the other chamber, said plate having an outlet from the former chamber, and means for supplying the material to said former chamber, comprising means for cutting the material from the surface of the ground and means for conducting the same to said traveling means.

14. In a machine of the character set forth, a wheeled frame, a casing carried thereby, a plate dividing the casing into two chambers, traveling means in one of the chambers for moving material therein, weed killing means in the other chamber, said plate having an outlet from the former chamber, and means for supplying the material to said former chamber, comprising means for cutting the material from the surface of the ground, means for disintegrating the material and means for conducting the disintegrated material to said traveling means.

15. In a machine of the character set forth, a wheeled frame, a casing carried thereby, a plate dividing the casing into two chambers and provided with an outlet opening from one of the chambers, a rotatable drum in the other chamber, means by which the interior of the drum has communication with the outlet, a heating means in the last-mentioned chamber, means for cutting the surface soil from the ground and mechanism whereby the soil is delivered from the cutting means to said outlet.

16. In a machine of the character set forth, a wheeled frame, a casing carried thereby, a plate in the casing dividing the same into chambers, a heating means in one of the chambers, said plate having an opening for the ingress from one chamber to the other of products of the heating means, means for cutting the material to be treated from the surface of the ground and means whereby said material is progressively moved from the cutting means to and through each of said chambers.

17. In a machine of the character set forth, a wheeled frame, a casing carried thereby, a plate in the casing, dividing the same into chambers and having an outlet opening for material, an endless traveling means in one chamber for moving the material over said plate to said outlet, a rotatable drum in the other chamber having an inlet in communication with the outlet from the first chamber and provided with an outlet, said drum adapted to feed the material from its inlet to its outlet, means in communication with outlet from the drum for conveying the material to the ground, a heating means in the drum chamber, said plate having an opening for the admission to the first mentioned chamber of the products of the heating means, means for cutting the material to be treated from the surface of the ground, and means for conducting said material to the endless traveling means.

18. In a machine of the character set forth, a wheeled frame, a casing carried thereby, a plate in the casing, dividing the same into chambers and having an outlet opening for material, an endless traveling means in one chamber for moving the material over said plate to the outlet, a rotative drum in the other chamber having an inlet in communication with outlet from the first chamber and provided with an outlet, said drum adapted to feed the material from its inlet to its outlet, means in communication with outlet from the drum for conveying the material to the ground, a heating means in the drum chamber, said plate having an opening for the admission to the first mentioned chamber of the products of the heating means, means for cutting the material to be treated from the surface of the ground, means for disintegrating the material and means for conducting the disintegrated material to the endless traveling means.

19. In a machine of the character set forth, a wheeled frame, a casing carried thereby, a plate in the casing, dividing the same into chambers and having an outlet opening for material, an endless traveling means in one chamber for moving the material over said plate to said outlet, a rotative drum in the other chamber having an inlet in communication with the outlet from the first chamber and provided with an outlet, said drum adapted to feed the material from its inlet to its outlet, means in communication with the outlet from the drum for conveying the material to the ground, a heating means in the drum chamber, said plate having an opening for the admission to the first mentioned chamber of the products of the heating means, means for cutting the material to be treated from the surface of the ground, means for disintegrating the material, means for conducting the disintegrated material to the endless traveling means, and means whereby said drum, endless traveling means, conducting means and disintegrator are operated by the travel of the vehicle.

In testimony whereof I affix my signature, in presence of two witnesses.

HENRY B. KORESSEL.

Witnesses:
HENRY SCHENK,
THEO. S. HENRICH.